(12) United States Patent
Parkinson

(10) Patent No.: US 7,970,737 B2
(45) Date of Patent: Jun. 28, 2011

(54) RECOVERY ADMINISTRATION OF GLOBAL TRANSACTION PARTICIPANTS

(75) Inventor: Paul Parkinson, Wenonah, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 12/013,157

(22) Filed: Jan. 11, 2008

(65) Prior Publication Data

US 2009/0182787 A1 Jul. 16, 2009

(51) Int. Cl.
*G06F 7/00* (2006.01)
(52) U.S. Cl. ......... 707/611; 707/690; 707/691; 707/758
(58) Field of Classification Search .............. 707/758, 707/611, 690, 691
See application file for complete search history.

(56) References Cited

U.S. PATENT DOCUMENTS

| 2002/0083078 A1* | 6/2002 | Pardon et al. ............. 707/104.1 |
| 2003/0154423 A1* | 8/2003 | Egolf et al. ..................... 714/15 |
| 2004/0181513 A1* | 9/2004 | Henderson et al. ............... 707/3 |

OTHER PUBLICATIONS

Zhao, Frances, et al., "Bringing Advanced Transaction Management Capabilities to Spring Applications", Excerpt from the Spring Framework Transaction Management documentation, May 2007, 17 pages.
Parkenson, Paul, et al., "How-To: Using JTA with Spring in Oracle Container for Java EE 11 Technology Preview", Oracle Technology Network, Apr. 2007, 6 pages.

* cited by examiner

*Primary Examiner* — Tim T. Vo
*Assistant Examiner* — Gary Koo
(74) *Attorney, Agent, or Firm* — Hickman Palermo Truong & Becker LLP

(57) ABSTRACT

A transaction system that allows for analysis and administration at the global transaction participant level is disclosed.

24 Claims, 3 Drawing Sheets

RECOVERY ADMINISTRATION OF GLOBAL TRANSACTION PARTICIPANTS

FIELD OF THE INVENTION

The present invention relates to a transaction processing system that allows for analysis and administration at the global transaction participant level.

BACKGROUND

Global transactions are those transactions that span multiple resources (e.g. a bank account transfer activity involving debiting one database and crediting another within a transaction) in which those resources may be physically very far apart. In order to coordinate various resources that are participants in a transaction, a transaction manager is required. Such a transaction manager uses a two-phase commit protocol to coordinate the transaction completion where all of the resources reach consensus and are locked during a first ('prepare') phase, and then committed (or rolledback as necessary) during a second ('commit') phase.

Within a database, transactions provide what is referred to as ACID properties (atomicity, consistency, isolation, and durability). During a two-phase commit, should a system failure such as a network communication or power outage occur, a recovery manager is responsible for driving the completion of a transaction to an atomic state. Although some systems may allow for basic reporting of such recovery transactions, there is no existing administrative mechanism that allows for analysis and administration of the global transaction participant level, or at an application program interface (API) level.

However, this is often the exact type of administration necessary in such failure situations. If this functionality does not exist, it is necessary for a problem solver to search database logs and/or contact database administrator in order to understand the exact nature of the failure. Such problem solving is time-consuming plus makes the failure analysis subject to error. Consequently, a centralized mechanism for analysis and administration and recovery of transactions is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A system for conducting resource-specific analysis and administration of global transaction participants from a transaction manager is disclosed herein. The system allows an administrative user to analyze any transactional resource deployed in a given database server, and to issue relevant commands upon that database server. Examples of transactional resources can include but are not limited to Java message service (JMS), Java database connection (JDBC), and Java connector architecture (JCA) transaction participants. These queries and commands may be issued even if the application server has not initiated a transaction where the transactional resource has participated.

System

Figure 1:
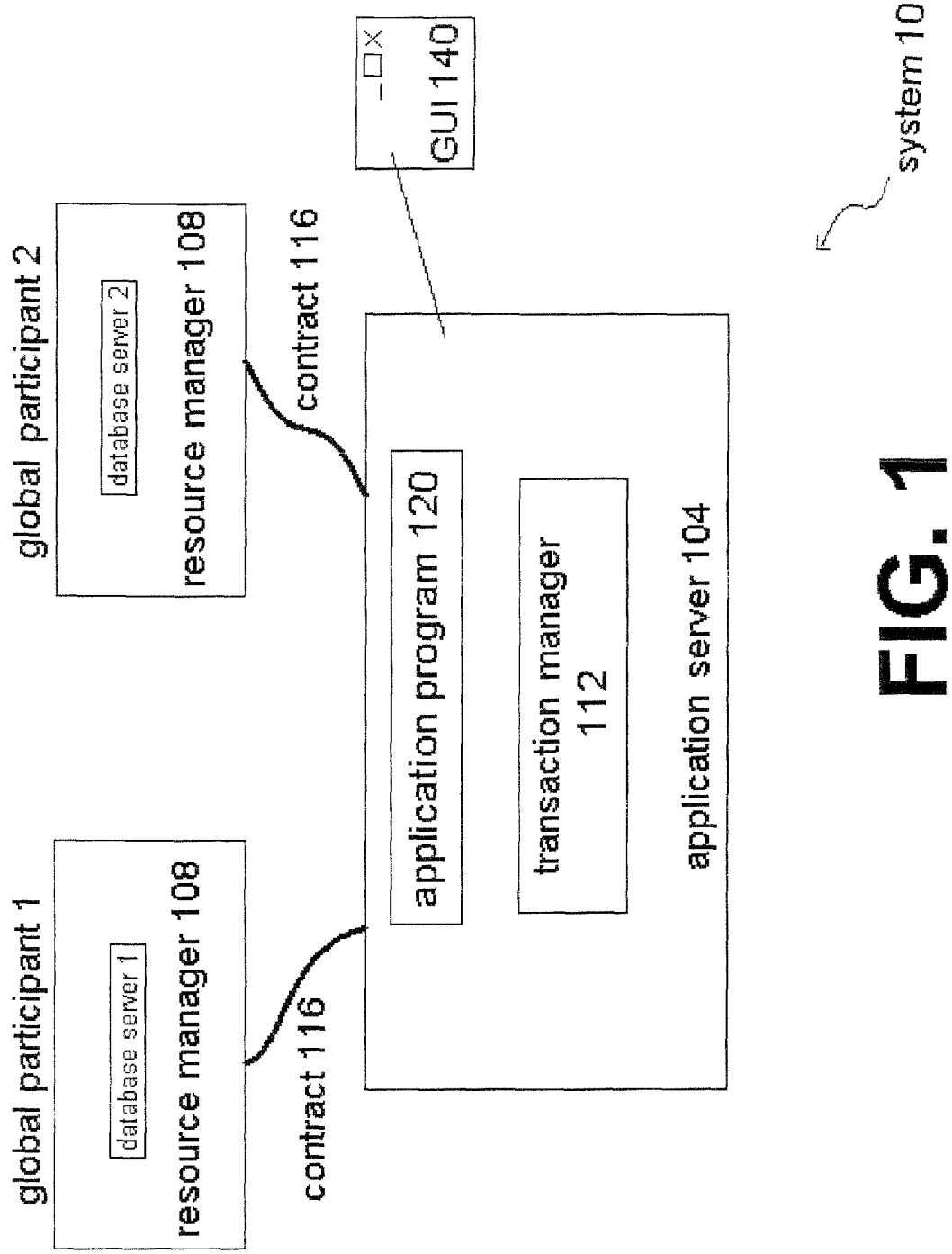
FIG. 1 is a block diagram that illustrates an example database system, according to an embodiment of the invention.

An example global transaction manager database system 100 is shown in FIG. 1, in which only two global participants (1 and 2) are shown although many other participants could be present. Each global participant has at least a resource manager 108 and a database server, although many other components could also be present. The resource manager 108 may be, but is not required to be, a database. In the event a disruption in service occurs, the resource manager 108 assists in determining the nature of the disruption.

A transaction manager 112 coordinates transaction completions between the global participants. The transaction manager 112 uses a two-phase process to achieve completion: first prepare, then commit. As shown in FIG. 1, the transaction manager 112 is a subsystem of the application server 104.

The application server 104 also hosts an administrative subsystem 120 which has access to the resource managers 108. The administrative subsystem 120 uses this access to perform analysis and administration of the system 100 at the global transaction participant level, and also at the application program interface (API) level.

As shown in FIG. 1, users access the administrative subsystem 120 through a graphical user interface GUI 140. A user can conduct resource-specific analysis and administration on a resource manager 108 through the GUI 140, including where the participants' transactions in question were not coordinated by the actual database server being queried. For example, a user could conduct analysis on all database servers present within the system 100 using the GUI 140, even though that database server may have been a passive participant in a transaction, and that transaction was not coordinated within the global participant upon which that database server is located.

Definitions

Within the system 100, the relationship between the resource managers 108 and the transaction manager 112 is sometimes referred to as a contract. To that end, FIG. 1 shows the transaction manager 112 communication with the resource managers 108 through contracts 116. However, the communications between the resource managers 108 and the transaction manager 112 are sometimes referred to as transactions. One abbreviation for transaction is XA. Accordingly, within this specification, when a term begins with XA, that is an abbreviation for transaction. Further, the transaction manager 112 assigns IDs to various tasks in carrying out its tasks. These transaction IDs are sometimes referred to as Xids.

The various interactions between the resource manager 108 and the transaction manager 112 are sometimes referred to as a contract. The system 100 exposes these interactions to an administrator. This exposure assists in solving problems when something has gone wrong in the global transaction.

EXAMPLE COMMANDS

The commands provided to the user through the GUI 140 by the system 100 include but are not limited to:
1. getIndoubtAndHeuristicXidsForResource(String resourceLocation): This command returns the list of indoubt and heuristically completed Xids for a given resource. Indoubt Xids in this list can be rolledback or committed, and heuristically completed Xids can be forgotten (discarded).
2. commitIndoubtXidOnResource(String resourceLocation, Xid xid): This command commits the specified indoubt Xid on the resource specified
3. rollbackindoubtXidOnResource(String resourceLocation, Xid xid): This command rolls back the specified indoubt Xid on the resource specified
4. forgetHeuristicXidOnResource(String resourceLocation, Xid xid): This command "forgets" (erases) the specified heuristically completed Xid on the resource specified A heuristically completed transaction is one that was completed at the participant level, rather than in reaction to a call issued by the transaction manager 112 in the ordinary course of business. In other words, a heuristically completed transaction is one that is usually completed by an administrator. Thus, heuristic is meant to be interpreted as the opposite of in-doubt. A participant is required by the XA protocols to remember such an autonomous action until told to forget (discard) by the transaction manager 112.

In the event of a disruption, the system 100 exploits configuration, security, and other features only present within the application server 104, and also shields the user from the complexities of interacting with the low-level APIs. The system 100 allows for end-to-end administration of global transactions, but is conveniently exposed through the GUI 140.

Without the system 100, any contract or arrangement between the resource manager 108 and transaction manager 112 is limited to the behind-the-scenes interactions that are not traceable or viewable. This means the transaction manager 112 and the resource managers 108 interact directly with each other, where no user affects this interaction.

The GUI 140 within the system 100 will screen/strip/filter the various datatypes showing, thereby freeing the user from needing to know these details. For example, the GUI 140 will represent the transaction ID (Xid) in a manner that is meaningful to a user and in the context of other information (e.g. the name of a transaction in English-like expressions, amount of time the transaction was active, etc.). Also, the GUI 140 prevents the user from being aware of programming details such as XAResource.recover flags. This data will instead be managed by the application 120. The user will only see a simple call, e.g.

getIndoubtAndHeuristicXidsForResource(String resourceLocation)

The above call allows a user to exploit what the application server 104 provides (e.g. creation of XAResources). This prevents the user from needing to write any code. To use the above call, the only thing the user needs to provide is a resource location, in the form of a character string (plain text). In the event of a system failure, the location of the failing resource will likely be available. This is because the expression "String resourceLocation" refers to the location where a connection factory is located within the application server 104 (and where "String" is the datatype). JDBC, JMS, and JCA connection factories can be found within a Java naming and directory interface (JNDI). A connection factory is an object that provides connections to various resource managers for use by applications. The most common connections provided by a connection factory are to ports on the resource manager 108. However, the connection factory may also connect directly to file systems.

Thus, while the system 100 becomes all the more useful when presented as a graphical user interface (GUI) 140, another useful feature of the system 100 is the integration/support within the application server 104, including providing the configuration of connection factories, connection pooling, transaction processing, and other runtime and recovery aspects. The system 100 also creates transaction resources from configured connection factories for the various operations mentioned in the invention disclosure. The system 100 provides configuration of security information and infrastructure for connecting to the various resource managers 108. By providing these features, the system 100 removes any need for additional configuration by the user.

Figure 2:
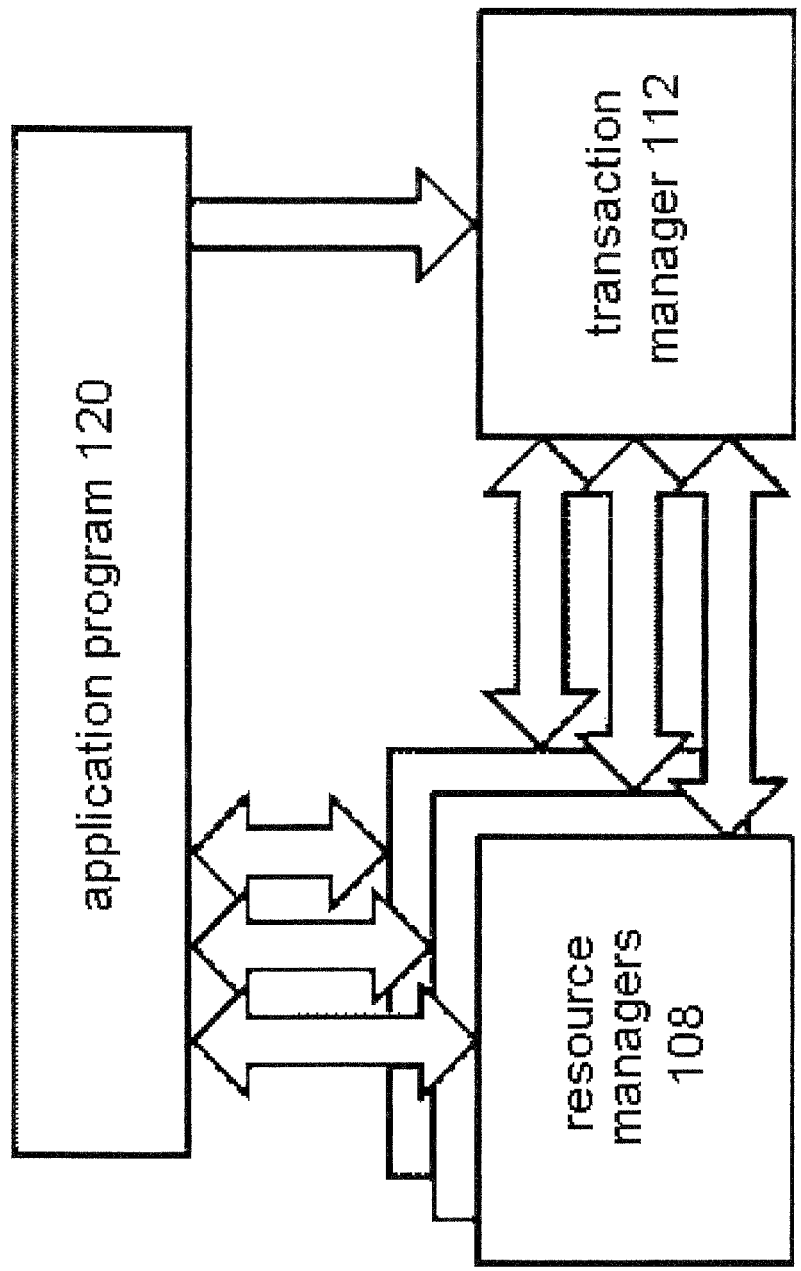
FIG. 2 depicts an example arrangement of tasks and responsibilities within an application server.

FIG. 2 shows a three step process used within the system 100. In step 1, the application program 120 obtains and uses resources from a group of resource managers 108. In step 2, the application program 120 defines transaction boundaries through an interface with the transaction manager 112. In step 3, the resource managers 108 exchange information about various transactions with the transaction manager 112.

The low-level API details of how the system 100 provides these resources is described as follows. Using the database 108 as an example, an XADataSource object has a getXAConnection method loaded thereon. The XAConnection in turn has a getConnection and getXAResource method.

When the application program 120 calls getConnection, in return the application program 120 gets (obtains) a connection to the database system 100 and then conducts tasks upon (e.g. issues inserts or other inquiries into the database). When the application program 120 does this, the transaction manager 112 will call getXAResource behind the scenes in order to scope and coordinate these tasks within a transaction using the XAResource. Accordingly, the XAResource is not used directly by any application or administrator other than the database system 100.

Hardware Overview

Figure 3:
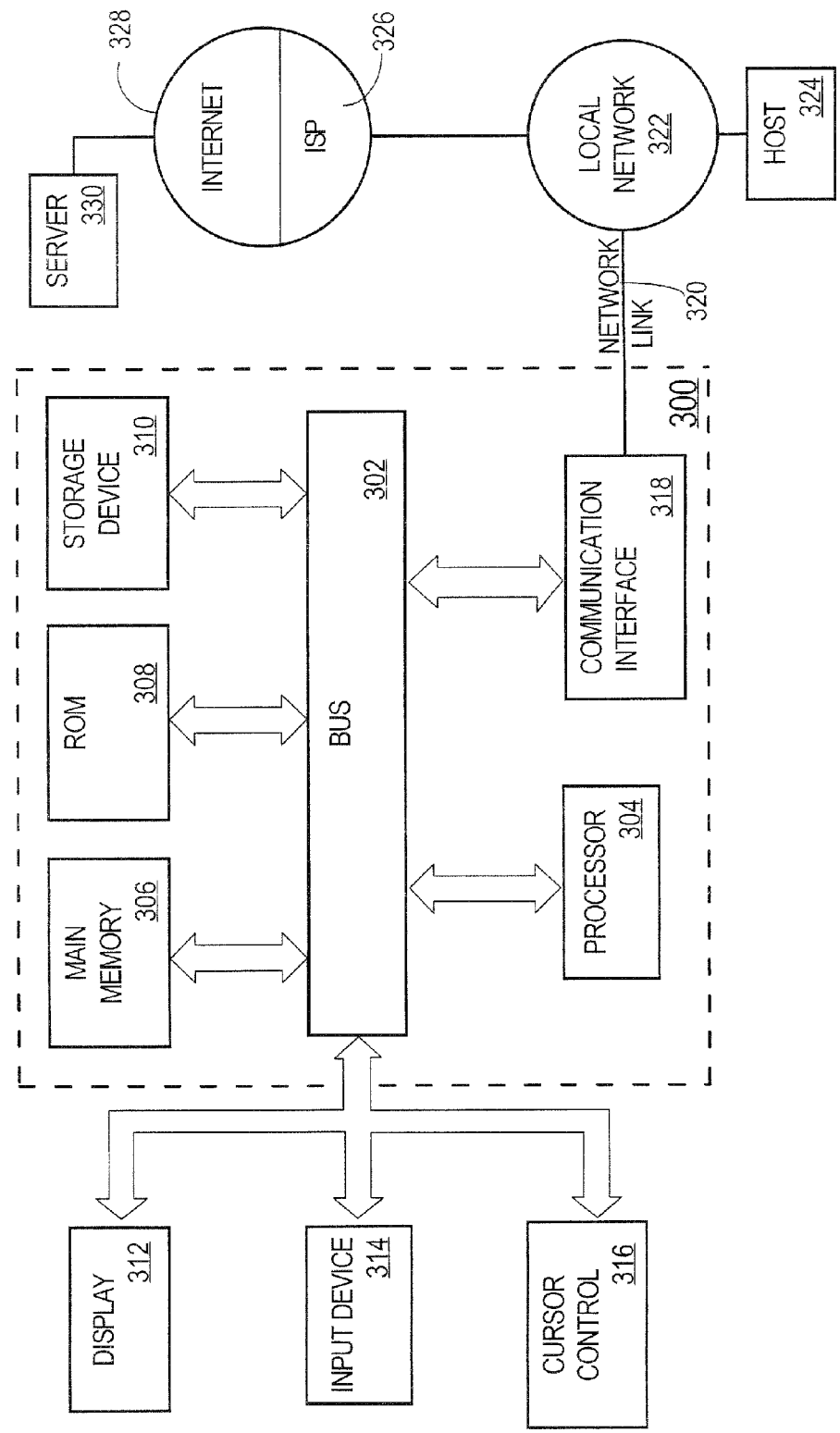
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method, comprising the steps of:
   a transaction manager in an application server initiating a global transaction that includes one or more transactions that are executed at a database server that is associated with a resource manager;
   while the global transaction is executing, receiving through a user interface at the application server one or more user commands entered by a user for the one or more transactions being executed at the database server as part of the global transaction;
   wherein said one or more user commands request an action to be taken with respect to said one or more transactions; and in response to receiving the one or more user commands, the application server causing the resource manager associated with the database server to perform said action at the database server, wherein said action includes one or more of:
  returning a list of identifiers of at least one of the one or more transactions;
  committing, at the database server, a first indoubt transaction of the one or more transactions;
  rolling back, at the database server, a second indoubt transaction of the one or more transactions; and
  discarding, at the database server, a heuristically completed transaction of the one or more transactions;
wherein the steps of the method are performed by one or more computing devices.

2. The method of claim 1, wherein said one or more user commands specify a status and request information for those of the one or more transactions that have said status.

3. The method of claim 1, further comprising:
performing analysis and administration at a global transaction participant level.

4. The method of claim 1, further comprising:
performing analysis and administration at an application program interface level.

5. The method of claim 1, wherein said action is returning the list of identifiers and wherein the list of identifiers includes transaction IDs of those transactions, of the one or more transactions, which are indoubt or are heuristically completed at the database server.

6. The method of claim 1, wherein said action is committing the first indoubt transaction by using a transaction ID that corresponds to the first indoubt transaction.

7. The method of claim 1, wherein said action is rolling back the second indoubt transaction by using a transaction ID that corresponds to the second indoubt transaction.

8. The method of claim 1, wherein said action is discarding the heuristically completed transaction by using a transaction ID that corresponds to the heuristically completed transaction.

9. The method of claim 1, wherein the transaction manager connects to the resource manager by using an object that conforms to one of:
  Java message service (JMS), Java database connection (JDBC), and Java connector architecture (JCA) participants.

10. The method of claim 1, further comprising:
the transaction manager coordinating transaction completions between a plurality of global participants using a two-phase prepare-commit process to achieve completion.

11. The method of claim 1, further comprising:
conducting analysis on one of a plurality of database servers wherein that database server may have been a passive participant in a transaction, and that transaction was not coordinated within a global participant upon which that database server is located.

12. The method of claim 1, further comprising:
causing the user interface to filter datatypes, thereby enabling the user to operate the user interface without knowing specific datatypes.

13. A non-transitory computer-readable storage medium storing one or more sequences of instructions which, when executed by one or more processors, cause the one or more processors to perform steps comprising:

a transaction manager in an application server initiating a global transaction that includes one or more transactions that are executed at a database server that is associated with a resource manager;
while the global transaction is executing, receiving through a user interface at the application server one or more user commands entered by a user for the one or more transactions being executed at the database server as part of the global transaction;
wherein said one or more user commands request an action to be taken with respect to said one or more transactions; and
in response to receiving the one or more user commands, the application server causing the resource manager associated with the database server to perform said action at the database server, wherein said action includes one or more of:
  returning a list of identifiers of at least one of the one or more transactions;
  committing, at the database server, a first indoubt transaction of the one or more transactions;
  rolling back, at the database server, a second indoubt transaction of the one or more transactions; and
  discarding, at the database server, a heuristically completed transaction of the one or more transactions.

14. The computer-readable storage medium of claim 13, wherein said one or more user commands specify a status and request information for those of the one or more transactions that have said status.

15. The computer-readable storage medium of claim 13, wherein the one or more sequences of instructions further comprise instructions which, when executed by the one or more processors, cause the one or more processors to perform:
performing analysis and administration at a global transaction participant level.

16. The computer-readable storage medium of claim 13, wherein the one or more sequences of instructions further comprise instructions which, when executed by the one or more processors, cause the one or more processors to perform:
performing analysis and administration at an application program interface level.

17. The computer-readable storage medium of claim 13, wherein said action is returning the list of identifiers and wherein the list of identifiers includes transaction IDs of those transactions, of the one or more transactions, which are indoubt or are heuristically completed at the database server.

18. The computer-readable storage medium of claim 13, wherein said action is committing the first indoubt transaction by using a transaction ID that corresponds to the first indoubt transaction.

19. The computer-readable storage medium of claim 13, wherein said action is rolling back the second indoubt transaction by using a transaction ID that corresponds to the second indoubt transaction.

20. The computer-readable storage medium of claim 13, wherein said action is discarding the heuristically completed transaction by using a transaction ID that corresponds to the heuristically completed transaction.

21. The computer-readable storage medium of claim 13, wherein the transaction manager connects to the resource manager by using an object that conforms to one of:
  Java message service (JMS), Java database connection (JDBC), and Java connector architecture (JCA) participants.

22. The computer-readable storage medium of claim 13, wherein the one or more sequences of instructions further comprise instructions which, when executed by the one or more processors, cause the one or more processors to perform:

the transaction manager coordinating transaction completions between a plurality of global participants using a two-phase prepare-commit process to achieve completion.

23. The computer-readable storage medium of claim 13, wherein the one or more sequences of instructions further comprise instructions which, when executed by the one or more processors, cause the one or more processors to perform:

conducting analysis on one of a plurality of database servers where that database server may have been a passive participant in a transaction, and that transaction was not coordinated within a global participant upon which that database server is located.

24. The computer-readable storage medium of claim 13, wherein the one or more sequences of instructions further comprise instructions which, when executed by the one or more processors, cause the one or more processors to perform:

causing the user interface to filter datatypes, thereby enabling the user to operate the user interface without knowing specific datatypes.

* * * * *

UNITED STATES PATENT AND TRADEMARK OFFICE
CERTIFICATE OF CORRECTION

| | | |
|---|---|---|
| PATENT NO. | : 7,970,737 B2 | Page 1 of 1 |
| APPLICATION NO. | : 12/013157 | |
| DATED | : June 28, 2011 | |
| INVENTOR(S) | : Parkinson | |

It is certified that error appears in the above-identified patent and that said Letters Patent is hereby corrected as shown below:

In column 3, line 17, delete "rollbackindoubtXidOnResource" and insert -- rollbackIndoubtXidOnResource --, therefor.

Signed and Sealed this
Fifteenth Day of November, 2011

David J. Kappos
*Director of the United States Patent and Trademark Office*